C. MAYNARD.
PORTABLE FIREPLACE.
APPLICATION FILED OCT. 25, 1916.

1,228,340.

Patented May 29, 1917.
2 SHEETS—SHEET 1.

WITNESSES

INVENTOR
Charles Maynard,
BY Victor J. Evans
ATTORNEY

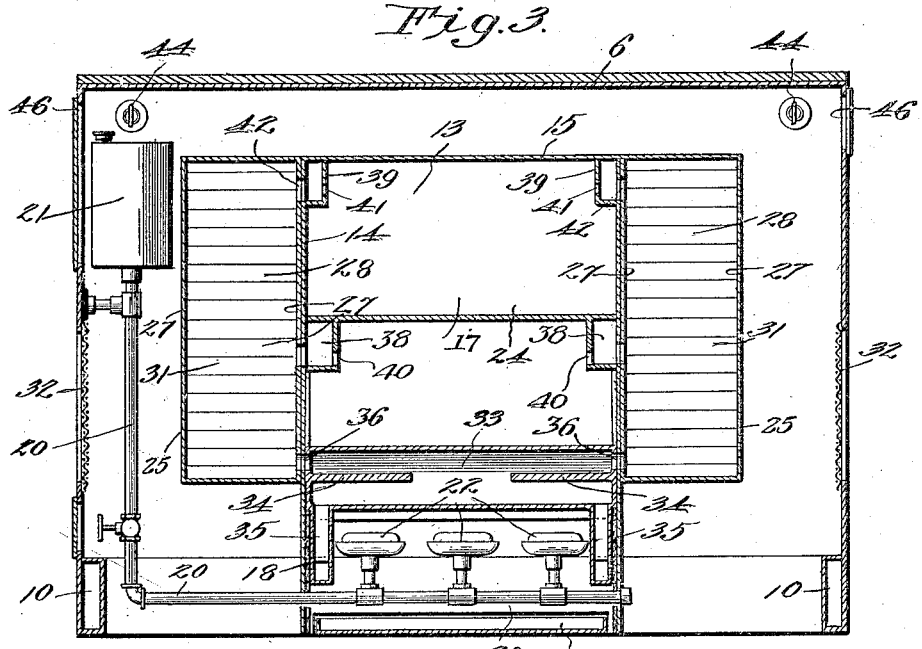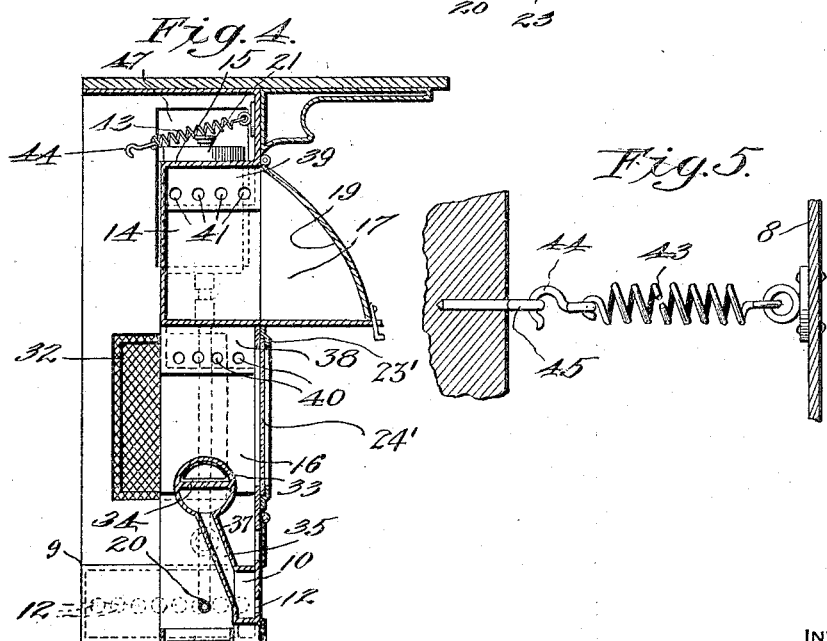

UNITED STATES PATENT OFFICE.

CHARLES MAYNARD, OF MILAN, MICHIGAN.

PORTABLE FIREPLACE.

1,228,340.  Specification of Letters Patent.  Patented May 29, 1917.

Application filed October 25, 1916. Serial No. 127,639.

*To all whom it may concern:*

Be it known that I, CHARLES MAYNARD, a citizen of the United States, residing at Milan, in the county of Washtenaw and State of Michigan, have invented new and useful Improvements in Portable Fireplaces, of which the following is a specification.

The present invention centemplates the provision of a portable heating apparatus adapted to be installed in the rooms of dwellings, and serving to more readily and efficiently heat the rooms by further heating the cold air rising from the floors and thereby the air when discharged from the heater will circulate around the room, thus accomplishing the heating of the rooms in an expeditious manner.

To this end, the invention among other features contemplates the provision of a fire place so designed as to adapt the same to be readily attached or removed, and further the heater is so designed as to retain food stuffs in a heated or warm condition.

With the above and other objects in view, the invention consists in the novel features, details of construction and combination of parts which will hereinafter be more fully set forth, illustrated in the accompanying drawings and pointed out in the appended claims.

Figure 1:
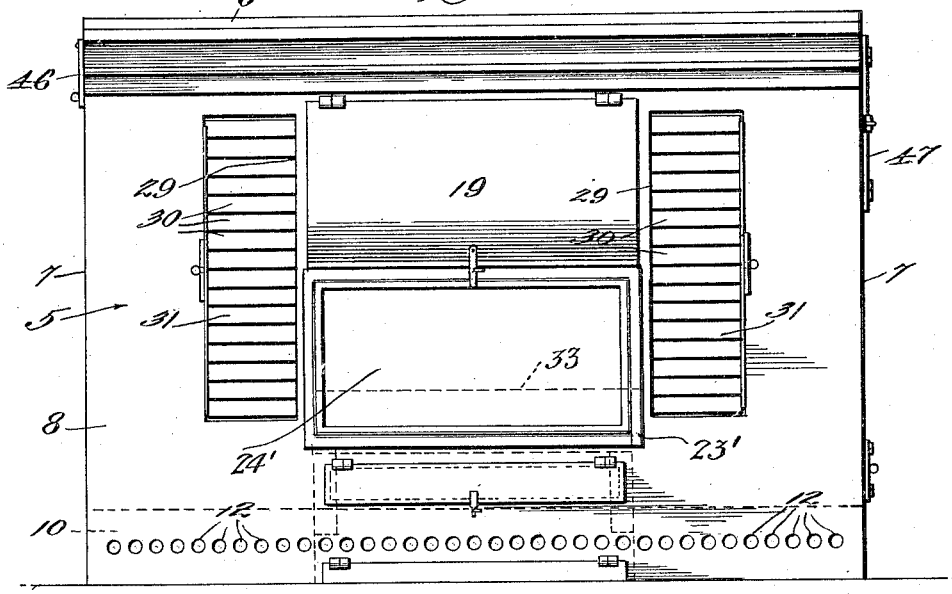
Figure 1 is a front elevation.
Figure 2:
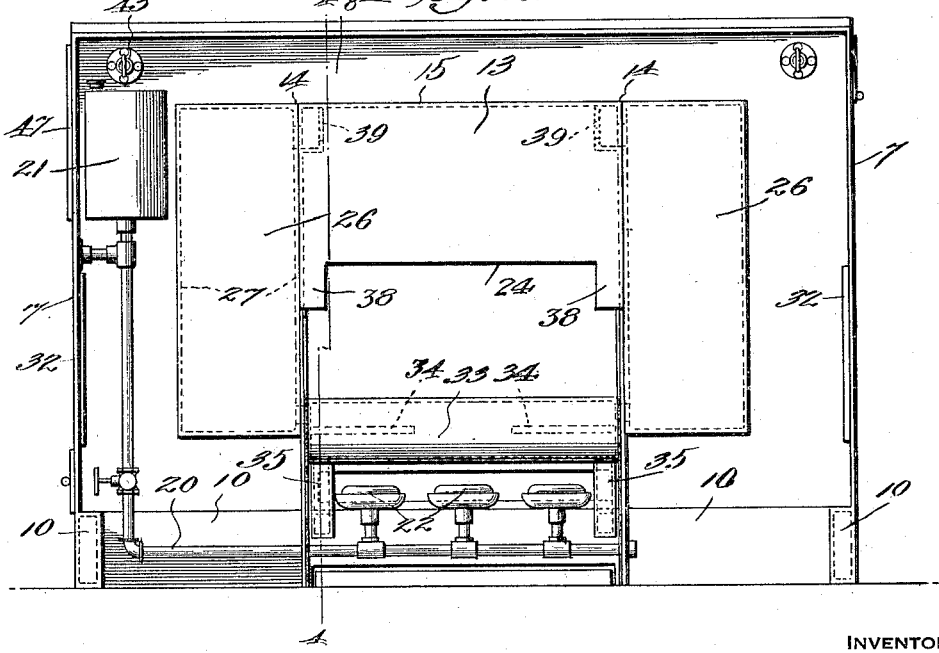
Fig. 2 is a rear elevation.

Fig. 3 is a transverse section;
Fig. 4 is a vertical section taken through Fig. 2; and Fig. 5 is a detail section illustrating the manner of connection of the heater with the wall of the dwelling.
Referring more particularly to the accompanying drawings, in which like characters of reference refer to corresponding parts in the several views, the heater generally comprises a substantially hollow outer rectangular casing 5, preferably constructed of metal or other like material, and provided with a top wall 6, opposite side walls 7, a front wall 8 and a rear wall 9. The material forming the outer casing 5 is struck inwardly, adjacent the base portion of the walls of said casing, to provide around the base portion and inwardly thereof, a continuous air duct 10 in which a quantity of cold air is admitted by the entrance of the air through the series of horizontally alined apertures 12, the latter being provided in all of the walls of the said outer casing 5.

Installed within the outer casing is an inner casing 13 preferably of rectangular form and of a smaller size than the size of the outer casing 5, so that when the said inner casing 13 is arranged within the outer casing, it will dispose the opposite side walls 14 of the inner casing in spaced parallelism with the side walls 7 of the outer casing and arrange the top wall 15 of the inner casing in spaced relation with the top wall 6 of the outer casing. The purpose of this arrangement will be hereinafter more fully set forth as the description of the invention is proceeded with. This inner casing 13 is partitioned off to provide in the lower half thereof a fire box 16, and in the upper portion a heating oven 17. The side walls of the inner casing forming the fire box are lined preferably with asbestos or the like material, denoted by the character 18, and utilized to increase the heating qualities of the heater. A closure 19 is adapted to close the front open end of the oven 17 to exclude the same from the entrance of cold air, thus adapting the oven as a heating means for food stuffs placed therein when desired to retain the same in a warm or heated state. In the base portion of the fire box 16 extends a fuel supply pipe 20 leading from the reservoir 21 and arranged on this line of piping are suitable burners 22, below which is a drip pan 23. I desire to have it understood that any suitable form of heater may be employed and substituted for the type of heater disclosed in this application, that is to say, such as kerosene, gasolene, gas or electric. A closure 23' is provided for closing the front open end of the fire box 16 having a suitable panel 24' formed of isinglass or the like material. The side walls of the inner casing 13 at a point substantially medially of their length and at a point directly below the oven shelf 24, is bent to form integral with the said inner casing, and exteriorly of and to opposite sides thereof, a pair of air heating chambers 25 comprising a closed rear wall 26, opposite side walls 27 and an open front 28. The said pair of air heating chambers are disposed directly in rear of and alining with the elongated openings 29, formed in the front wall 8 of the outer casing to opposite sides of the fire box 16. A series of slats 30 are pivotally mounted in the side walls of the openings 29, thus utilizing the openings 29 as registers 31, the registers 31 being arranged at right angles with the registers 32 provided in the side walls 7 of the outer casing 5. The function of these registers will be hereinafter clearly set forth. Defined between the side walls 14 of the inner receptacle and slightly elevated above the burners 22 is a horizontally disposed heating cylinder 33 having arranged therein spaced baffle plates 34. Arranged at the opposite ends of the hollow cylinder 33 is an air inlet passage 35 and an air outlet passage 36. A duct 37 is provided in the conduit 10 and communicates with the air ducts 35, while the outlets 36 open out in the oppositely arranged air chambers 26 and 27. Thus as the cold air rising from the floor enters the conduit 10 through the series of horizontally alined openings 12 the air circulates from the conduit and enters the cylinder 33 through the inlets 35, and the cold air entering the cylinder striking the baffle plates 34, affording sufficient circulation of the air within the cylinder to be properly heated previous to its exit from the cylinder within the heating chambers 26 and 27. The point of formation of the air chambers 26 and 27 with the inner casing 13, provides within the side walls 14 forming the fire box, a pair of horizontally alined U-shaped channels 38 and further providing a second pair of horizontally alined channels 39 in the upper extreme corners of the oven 17. By the employment of the channels 38, the cold air entering the fire box will be permitted to escape within the channels 38 by passing through the openings 40 thereof and entering the respective air heating chambers 26 and 27, whereas any cold air entering the oven 17 will likewise escape from the oven within the channel 39 through the opening 41 and enter the said air heating chambers.

From the foregoing it will be apparent that upon lighting the burners 22 will heat the cylinder 33, the air entering the conduit 10 will pass within the cylinder, thence within the air heating chambers 26 and 27, further the cold air within the fire box 16 will escape from the channels 38 within the respective air heating chambers, while the cold air contained in the oven 17 will pass through the openings 41 of the channel 39 and escape from the latter within the said heating chambers 25 and 26, due to the fact that the channels 38 as well as 39 are communicated with the respective air heating chambers through the employment of the duct 42. Assuming that the heated air is properly discharged from the air duct 10, the fire box 16 and the oven 17, within the air heating chambers 26 and 27 the heated air contained within the latter will be discharged into the room through the respective registers 31 and 32. The slats 29 of the registers 30 may be opened and closed at the will of the operator.

In installing the heating apparatus for use, and for holding the said apparatus in supported position, use is made of a pair of spring hooks 43 suitably connected to the wall of a dwelling, and the hooked end 44 is inserted in suitable eyes 45. The openings 46 permit the operator to gain access to the spring hook 43 when it is desired to connect or release the same from the eye bolts 45. Further, to afford access to the tank 21 to permit of revolving the same, use is made of a hinged door 47 hingedly connected to one of the side walls 7 of the outer casing 7.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:

1. In a heating apparatus comprising an outer casing having formed contiguous with the inner base portion thereof an air conduit, an inner casing arranged in the outer casing and partitioned off to provide upper and lower compartments, an air chamber arranged on opposite sides of the inner casing and communicating with the respective compartments of the said inner casing for heating the air passing from the compartments within such chambers, and means arranged in the lower compartment of said inner casing for distributing the air received from the air conduit to the chambers in a heated condition.

2. In a heating apparatus comprising an outer casing having formed contiguous with the inner base portion thereof an air conduit, an inner casing arranged in the outer casing and partitioned off to provide upper and lower compartments, an air chamber arranged on opposite sides of the inner casing and communicating with the respective compartments of the said inner casing for heating the air passing from the compartments within such chambers, and means arranged in the lower compartment of said inner casing for distributing the air received from the air conduit to the chambers in a heated condition, and registers formed in the front and sides of the outer casing whereby the air received in the air chambers may be distributed therefrom, substantially as and for the purpose specified.

3. In a portable heating apparatus comprising inner and outer spaced casings, the outer casing being provided along the base portion thereof with a continuous air conduit, a heating cylinder arranged within the inner casing for receiving the air contained in the air conduit, means for heating said cylinder, a baffle plate arranged in the cylinder at points between the inlets and outlets thereof, an air chamber disposed on opposite sides of the inner casing and integral therewith and in which the air from the said cylinder is distributed in a heated condition, and registers formed in the outer casing for allowing the heated air contained in the air chambers to be discharged therefrom, substantially as and for the purpose specified.

4. In a portable heating apparatus comprising inner and outer spaced casings, the outer casing being provided along the base portion thereof with a continuous air conduit, a heating cylinder arranged within the inner casing for receiving the air contained in the air conduit, means for heating said cylinder, a baffle plate arranged in the cylinder at points between the inlets and outlets thereof, an air chamber disposed on opposite sides of the inner casing and integral therewith and in which the air from the said cylinder is distributed in a heated condition, said inner casing being provided with upper and lower compartments, the point of formation of the air chambers with the inner casing providing channels having apertures for permitting of the air within the respective compartments being distributed within said air chambers, and means mounted in the outer casing for permitting of the air to escape from the air chambers in a heated condition, substantially as and for the purpose specified.

In testimony whereof I affix my signature.

CHARLES MAYNARD.

Copies of this patent may be obtained for five cents each, by addressing the "Commissioner of Patents, Washington, D. C."